(12) United States Patent
McGrane et al.

(10) Patent No.: US 12,167,739 B2
(45) Date of Patent: Dec. 17, 2024

(54) PET FOOD PRODUCT

(71) Applicant: MARS, INCORPORATED, McLean, VA (US)

(72) Inventors: Scott McGrane, Melton Mowbray (GB); James W. Marshall, Melton Mowbray (GB); Alice Deal, Verden (DE); Emily Marshall, Melton Mowbray (GB)

(73) Assignee: MARS, INCORPORATED, McLean, VA (US)

(*) Notice: Subject to any disclaimer, the term of this patent is extended or adjusted under 35 U.S.C. 154(b) by 427 days.

(21) Appl. No.: 16/956,458

(22) PCT Filed: Dec. 20, 2018

(86) PCT No.: PCT/IB2018/060454
§ 371 (c)(1),
(2) Date: Jun. 19, 2020

(87) PCT Pub. No.: WO2019/123385
PCT Pub. Date: Jun. 27, 2019

(65) Prior Publication Data
US 2021/0106028 A1   Apr. 15, 2021

(30) Foreign Application Priority Data

Dec. 21, 2017   (GB) ..................... 1721627

(51) Int. Cl.
*A23K 50/48*   (2016.01)
*A23K 10/22*   (2016.01)
(Continued)

(52) U.S. Cl.
CPC .............. *A23K 50/48* (2016.05); *A23K 10/22* (2016.05); *A23K 20/147* (2016.05)

(58) Field of Classification Search
CPC ...... A23K 50/48; A23K 10/22; A23K 20/147; A23K 20/142; A23K 20/158
See application file for complete search history.

(56) References Cited

U.S. PATENT DOCUMENTS

| | | |
|---|---|---|
| 4,070,490 A | 1/1978 | Lugay et al. |
| 4,168,322 A | 9/1979 | Buckley et al. |
| (Continued) | | |

FOREIGN PATENT DOCUMENTS

| | | |
|---|---|---|
| AT | 410 623 B | 6/2003 |
| CN | 1437445 | 8/2003 |
| (Continued) | | |

OTHER PUBLICATIONS

Kerns, Nancy, The Facts You Need Before Feeding Your Dog a Fiber Regiment, Aug. 2001, updated Oct. 2017, https://www.whole-dog-journal.com/food/the-facts-you-need-before-feeding-your-dog-a-fiber-regiment/, pp. 1-5. (Year: 2017).*

(Continued)

*Primary Examiner* — Trevor Love
(74) *Attorney, Agent, or Firm* — Baker Botts L.L.P.

(57) ABSTRACT

A pet food product comprising a fat component in an amount of from 2.0 wt % to 8.0 wt % by total weight of the pet food product, and a proteinaceous component in an amount of from 6.0 wt % to 14.0 wt % by total weight of the pet food product, wherein said proteinaceous component comprises polypeptides and free amino acids, wherein the ratio of the fat component to the proteinaceous component is from about 0.45:1.0 to about 0.0:1.0, and wherein the amount of free amino acids in the pet food product is at least 0.5 wt % by total weight of the pet food product.

9 Claims, 2 Drawing Sheets

(51) Int. Cl.
    *A23K 20/142*        (2016.01)
    *A23K 20/147*        (2016.01)
    *A23K 20/158*        (2016.01)

(56)              References Cited

U.S. PATENT DOCUMENTS

| | | | |
|---|---|---|---|
| 4,169,162 | A | 9/1979 | Appleman |
| 4,247,562 | A | 1/1981 | Bernotavicz |
| 4,264,628 | A | 4/1981 | Hill |
| 4,267,195 | A | 5/1981 | Boudreau et al. |
| 4,791,002 | A | 12/1988 | Baker et al. |
| 4,810,509 | A | 3/1989 | Kanegae et al. |
| 4,895,731 | A | 1/1990 | Baker et al. |
| 5,527,693 | A | 6/1996 | Cardillo et al. |
| 5,792,504 | A | 8/1998 | Poppel et al. |
| 6,080,419 | A | 6/2000 | Stookey |
| 6,280,779 | B1 | 8/2001 | Nadeau et al. |
| 6,372,282 | B1 | 4/2002 | Edens et al. |
| 6,379,738 | B1 | 4/2002 | Dingman et al. |
| 6,440,485 | B1 | 8/2002 | Cheuk et al. |
| 6,582,740 | B1 | 6/2003 | May et al. |
| 7,320,876 | B2 | 1/2008 | Webel et al. |
| 7,575,771 | B2 | 8/2009 | Ciantar et al. |
| 7,604,829 | B2 | 10/2009 | Schopf et al. |
| 7,736,686 | B2 | 6/2010 | Dingman et al. |
| 9,968,115 | B2 | 5/2018 | Rayner et al. |
| 2004/0197462 | A1 | 10/2004 | Hall |
| 2004/0253342 | A1 | 12/2004 | Townsend et al. |
| 2005/0142169 | A1 | 6/2005 | Imafidon et al. |
| 2005/0158367 | A1 | 7/2005 | Hershberger |
| 2006/0105098 | A1 | 5/2006 | Merrick |
| 2007/0071852 | A1 | 3/2007 | Krueger et al. |
| 2008/0076823 | A1 | 3/2008 | Watkins et al. |
| 2008/0102161 | A1 | 5/2008 | Ota et al. |
| 2008/0233244 | A1 | 9/2008 | Swenson |
| 2009/0111877 | A1 | 4/2009 | Yamka et al. |
| 2009/0143301 | A1 | 6/2009 | Olson et al. |
| 2009/0208612 | A1 | 8/2009 | Reiser et al. |
| 2010/0166940 | A1 | 7/2010 | McMindes et al. |
| 2010/0303978 | A1 | 12/2010 | Sunvold et al. |
| 2011/0111102 | A1 | 7/2011 | Saylock |
| 2011/0165304 | A1 | 7/2011 | Kortes |
| 2011/0200705 | A1 | 8/2011 | Tricarico et al. |
| 2011/0250326 | A1 | 10/2011 | Cheuk et al. |
| 2011/0256282 | A1 | 10/2011 | Piechocki et al. |
| 2012/0082762 | A1 | 4/2012 | Weinberg et al. |
| 2012/0141643 | A1 | 6/2012 | Davidek et al. |
| 2012/0171336 | A1 | 7/2012 | Dixon |
| 2012/0177785 | A1 | 7/2012 | Pibarot et al. |
| 2012/0213889 | A1 | 8/2012 | Chiang |
| 2013/0059028 | A1 | 3/2013 | Foy et al. |
| 2013/0129905 | A1 | 5/2013 | Deak |
| 2013/0209614 | A1 | 8/2013 | Doare-broux et al. |
| 2013/0330455 | A1 | 12/2013 | Buxmann et al. |
| 2014/0134306 | A1 | 5/2014 | Sakaji et al. |
| 2014/0141134 | A1 | 5/2014 | Johnson et al. |
| 2014/0154390 | A1 | 6/2014 | Rayner et al. |
| 2014/0227386 | A1 | 8/2014 | Niceron et al. |
| 2014/0328976 | A1 | 11/2014 | Huynh-ba et al. |
| 2015/0004284 | A1 | 1/2015 | Sakoda et al. |
| 2015/0320085 | A1 | 11/2015 | Ray |
| 2018/0295862 | A1 | 10/2018 | Mao et al. |

FOREIGN PATENT DOCUMENTS

| | | |
|---|---|---|
| CN | 101128109 A | 2/2008 |
| CN | 101959430 | 1/2011 |
| CN | 102573857 A | 7/2012 |
| CN | 102894193 | 1/2013 |
| CN | 104010521 | 8/2014 |
| CN | 104642721 | 5/2015 |
| CN | 104837358 A | 8/2015 |
| CN | 106721361 A | 5/2017 |
| EP | 0 008 728 A2 | 3/1980 |
| EP | 0 241 097 A1 | 10/1987 |
| EP | 0 567 433 | 10/1993 |
| EP | 0 577 463 A2 | 1/1994 |
| EP | 1 797 771 A1 | 6/2007 |
| EP | 2 875 736 A1 | 5/2015 |
| JP | S49-079865 | 8/1974 |
| JP | H07-184595 | 7/1995 |
| JP | H11-127797 | 5/1999 |
| JP | 2000-515379 A | 11/2000 |
| JP | 2004-121022 | 4/2004 |
| JP | 2006-510708 A | 3/2006 |
| JP | 2006-511209 | 4/2006 |
| JP | 2006-191910 A | 7/2006 |
| JP | 2008-514200 A | 5/2008 |
| JP | 2009-545308 A | 12/2009 |
| JP | 2011-510621 A | 4/2011 |
| JP | 2013-507122 A | 3/2013 |
| JP | 2013-516188 A | 5/2013 |
| JP | 2014-131509 | 7/2014 |
| JP | 2015-156846 A | 9/2015 |
| JP | 2016-49056 A | 4/2016 |
| RU | 2 403 011 C2 | 11/2010 |
| RU | 2420210 C2 | 6/2011 |
| RU | 2 638 525 C2 | 12/2017 |
| WO | WO 00/51443 A1 | 9/2000 |
| WO | WO 00/69276 | 11/2000 |
| WO | WO 03/037102 A2 | 5/2003 |
| WO | WO 2004/016097 A1 | 2/2004 |
| WO | WO 2010/077356 | 7/2010 |
| WO | WO 2012/008994 A2 | 1/2012 |
| WO | WO 2012/047800 A1 | 4/2012 |
| WO | WO 2014/015000 A1 | 1/2014 |
| WO | WO 2014/092158 A1 | 6/2014 |
| WO | WO 2014/092716 A1 | 6/2014 |
| WO | WO 2014/098193 A1 | 6/2014 |
| WO | WO 2015/004300 A1 | 1/2015 |
| WO | WO 2015/048339 A2 | 4/2015 |
| WO | WO 2016/176456 A1 | 11/2016 |
| WO | WO 2016/176465 A1 | 11/2016 |
| WO | WO 2016/176466 | 11/2016 |
| WO | WO 2017/103905 | 6/2017 |
| WO | WO 2018/125615 | 7/2018 |

OTHER PUBLICATIONS

Anon: "Scientific Opinion on the safety and efficacy of the use of amino acids (chemical group 34) when used as flavourings for all animal species", The EFSA Journal, 12(5):3670 (2014), 19 pages.

Beauchamp, et al., "Flavor preferences in cats (*Felis catus* and *Panthera* sp.)", Journal of Comparative Physiological Psychology, American Psychological Association, US, 91(5):1118-1127 (1977).

M. Sheffield-Moore, et al., "Isotopic decay of urinary or plasma 3-methylhistidine as a potential biomarker of pathologic skeletal muscle loss", Journal of Cachexia, Sarcopenia and Muscle Dec. 2013, (Sep. 6, 2013), vol. 5, No. 1, doi: 10.1007/s13539-013-0117-7, ISSN 2190-5991, pp. 19-25 [2].

Peterson, "Don't Let Your Senior Cat Become a Skinny Old Kitty—Feline Nutrition", feline-nutrition, (Sep. 19, 2015), pp. 1-6, URL: http://feline-nutrition.org/nutrition/dont-let-your-senior-cat-become-a-skinny-old-kitty, (Jul. 20, 2017).

Sugawara, et al., "Measurement of the Rate of Myofibrillar Protein Degradation Using the Arteriovenous Difference in Plasma 3-Methylhistidine Concentration of Rats.", Journal of Nutritional Science and Vitaminology, (Aug. 1, 2009), vol. 55, doi: 10.3177/jnsv.55.381, pp. 381-384.

New Vision of Science, Kitchen Adventure: Reveal the Scientific Secrets of Cooking (France) Translated by Tian Jun, Commercial Press, First Edition May 2013, ISBN 978-7-100-09732-1, pp. 134-137, with English Translation (11 pages).

Bake Info, Starch, published Feb. 23, 2014, accessed on Nov. 30, 2020; available at: https://web.archive.org/web/20140223073854/https://www.bakeinfo.co.nz/Facts/Bread-making/Bread-ingredients/Starch (Year: 2014) 2 pages.

Definition of "ambient pressure". (1992). In C. G. Morris (Ed.), Academic Press Dictionary of Science and Technology (4th ed.). Elsevier Science & Technology, 2 pages. Credo Reference: https://search.credoreference.com/contenl/entry/apdsl/ambient_pressure/0?institutionld=743 (Year: 1992).

(56) References Cited

OTHER PUBLICATIONS

Mintel Group Ltd., "Veal and Chicken Meat in Jelly for Puppies" Jan. 2015 http://www.gnpd.com, (4 pages).
Mintel Group Ltd., "Chicken Flavour Gravy" May 2006 http://www.gnpd.com, (2 pages).
Koppel et al., "The Effects of Fiber Inclusion on Pet Food Sensory Characteristics and Palatability," Animals, 5, 110-125; doi: 10.3390/ani5010110 (2015).

* cited by examiner

PET FOOD PRODUCT

CROSS-REFERENCE TO RELATED APPLICATIONS

This application is a U.S. National Stage Patent Application under 35 U.S.C. § 371 of International Patent Application No. PCT/IB2018/060454, filed on Dec. 20, 2018, which claims priority to United Kingdom Patent Application Serial No. GB 1721627.6, filed on Dec. 21, 2017, the contents of each of which are hereby incorporated by reference in their entirety, and to each of which priority is claimed.

This invention relates to the use of a proteinaceous additive comprising free amino acids to improve palatability of pet food products, and to pet food products having a particular fat to protein ratio and containing a proteinaceous component comprising free amino acids.

Many canine and feline companion animals can be fussy with food. Cats in particular are much more selective than dogs, and there is a particular need for the development of new pet food products for cats. An animal will often refuse to eat a foodstuff that it has been accepting over some time, or refuse to eat any more than a minimal amount of a foodstuff. Part of this phenomenon can be driven by subtle changes in the composition of the foodstuff. These changes might not be perceived by the human consumer, but due to a difference in the olfactory and gustatory systems, feline and canine companion animals may well perceive these differences. These sensory differences can be due to natural variation of the raw materials used or when materials are in short supply and have to be substituted with alternatives such as more sustainable materials. This can be very frustrating for the owner and can result in the owner perceiving that the animal is unhappy and not enjoying its food. An animal may also fail to ingest its required amount of essential nutrients if not consuming an adequate amount of food available to it. Therefore, there exists a need for a way to encourage companion animals to eat the foodstuff with which it is provided. Most commercially available pet foods are provided in a range of different flavours and/or textures. However, the companion animal owner will know that often a companion animal will suddenly, for no clear reason, refuse the product that the owner perceives to be its most preferred.

Pet food products may include meat and also typically contain significant amounts of animal by-products and non-animal derived ingredients in order to prepare high quality food that provides the pet with the required nutrient profile without competing with the human food demand for meat. As the global population increases the global demand for high protein foods including meat is expected to increase, so an increasing need for pet foods prepared from alternative proteins while meeting the nutritional needs of pets is expected. It would be desirable to meet these needs without increasing (and preferably whilst reducing) the environmental impact, particularly in respect of deforestation and climate change, of growing populations. It would also be desirable to improve the palatability of pet food products which are prepared from more sustainable materials.

In view of the afore-mentioned problems, it would be desirable to provide new pet food products which at least maintain the palatability of existing products, and particularly wherein the palatability of the pet food product is improved, without being restricted to or being reliant upon the use of specific raw materials. It would be particularly desirable to provide new pet food products prepared from more sustainable materials and to provide methods for improving the palatability of pet food products which are prepared from more sustainable materials. It is also preferable for new products to be prepared within the general framework of existing recipes, and using existing processing assets, and to provide methods for improving the palatability of existing pet food products.

The present inventors have studied whether companion animals can distinguish between pet food products of differing fat and protein contents, and the effects of modifying the proteinaceous component of a pet food product. Surprisingly, the inventors have found that companion animals can distinguish between products with differing fat to protein ratios and that companion animals prefer a product where part of the protein is or has been replaced/substituted with a proteinaceous additive comprising free amino acids. Unexpectedly, the inventors have found that the impact of free amino acids on the palatability of a product is dependent on the fat to protein ratio of the product.

According to a first aspect of the invention, there is provided a pet food product comprising a fat component in an amount of from about 2.0 wt % to about 8.0 wt % by total weight of the pet food product, and a proteinaceous component in an amount of from about 6.0 wt % to about 14.0 wt % by total weight of the pet food product, wherein said proteinaceous component comprises polypeptides and free amino acids, wherein the ratio of the fat component to the proteinaceous component is from about 0.45:1.0 to about 1.0:1.0, and wherein the content of free amino acids in the pet food product is at least 0.5 wt % by total weight of the pet food product.

DETAILED DESCRIPTION

Figure 1:
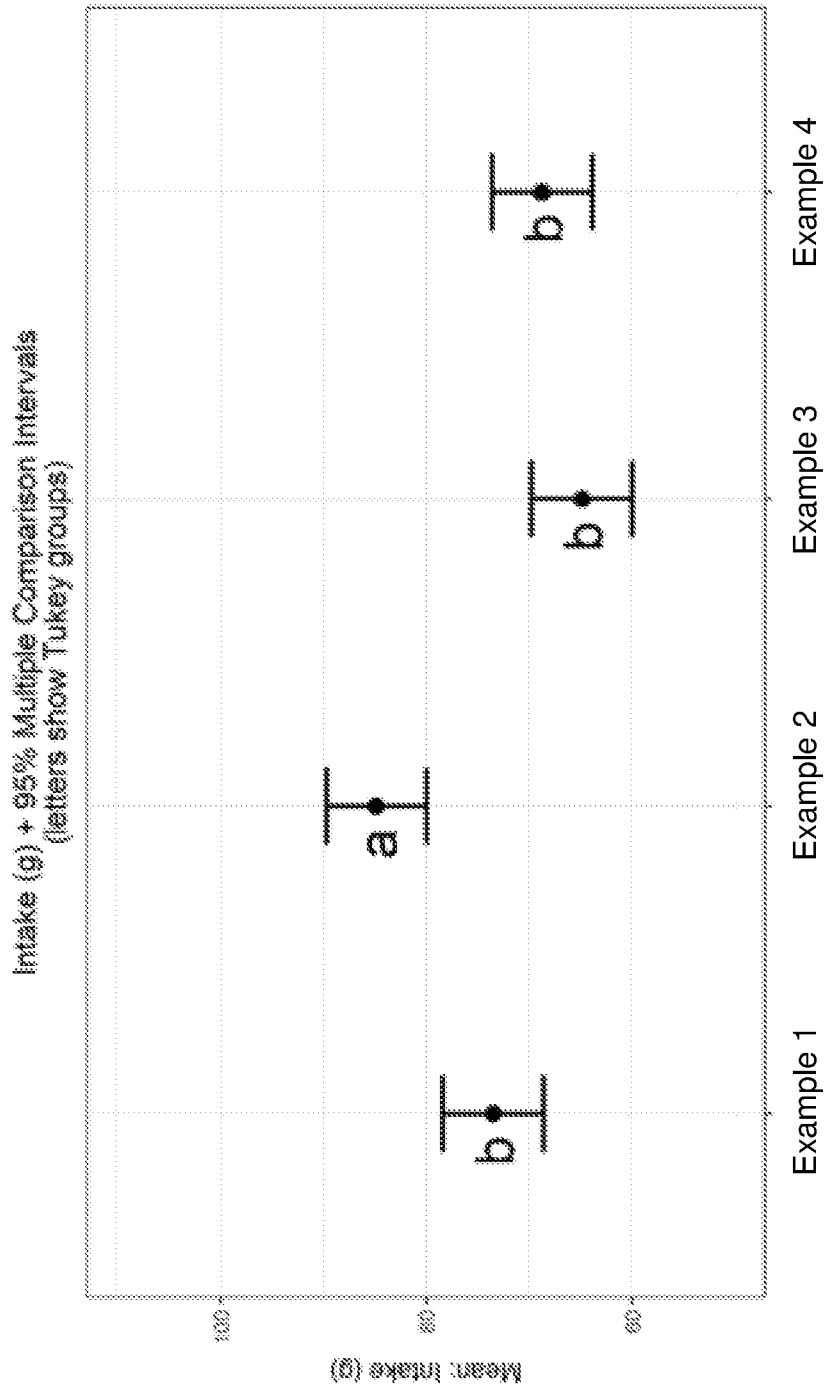
FIG. 1 shows the mean intake (g) across Examples 1-4.

The present inventors have found that palatability of a pet food product comprising fat and protein can be improved by adding free amino acids. Thus, the present invention concerns a pet food product comprising a fat component and a proteinaceous component wherein said proteinaceous component comprises polypeptides and free amino acids. The free amino acids can include one or more types of free amino acids. The free amino acids are preferably selected from the group consisting of alanine, glycine, histidine, proline, serine and threonine. More preferably, the free amino acids consist of or comprise at least glycine, and optionally one or more other amino acids which are preferably selected from alanine, histidine, proline, serine and threonine. In one embodiment, the free amino acids consist of glycine.

The free amino acids may be derived from, or in the form of, a protein hydrolysate.

Similarly, the free amino acids may be derived from, or in the form of, a yeast extract.

The term "proteinaceous" refers to any substance which contains amino acids, such as free amino acids and polypeptides. The term "polypeptides" as used herein includes "short polypeptides" which may also be herein referred to as "peptides". The proteinaceous component of the pet food of the invention comprises polypeptides and free amino acids, and may consist of polypeptides and free amino acids.

The term "proteinaceous additive" as used herein refers to a substance comprising free amino acids. The proteinaceous additive may consist or consist essentially of free amino acids. The proteinaceous additive may be in the form of, or derived from, a protein hydrolysate or a yeast extract. A protein hydrolysate or a yeast extract, and particularly a yeast extract, may optionally further comprise polypeptides.

The term "protein" as used herein refers to a proteinaceous component which may or may not contain free amino acids, for example the term "protein" can refer to a substance consisting of polypeptides.

The term "fat to protein ratio" as used herein refers to the ratio of the total amount of the fat component in the pet food product to the total amount of the proteinaceous component in the pet food product. The "fat to protein" ratio may herein be abbreviated to "F:P".

By way of illustration, if the fat content of the pet food product is not modified, the addition of a proteinaceous additive to the pet food product will reduce the fat to protein ratio (F:P) because the free amino acids contribute to the total amount of proteinaceous material in the product. The inventors have found that the addition of a proteinaceous additive may change the palatability of a pet food product. However, the inventors have also observed that animals are sensitive to changes in the F:P ratio such that the addition of a proteinaceous additive to a recipe will not necessarily improve palatability. Unexpectedly, the present inventors have found that palatability of a wet pet food product is significantly improved by substituting a portion of the protein with a proteinaceous additive comprising free amino acids. In this scenario, the F:P ratio is not reduced by the addition of the proteinaceous additive because the total amount of proteinaceous material in the product is unchanged by the substitution.

Most notably, the present inventors have found that palatability is most significantly improved when the pet food product (i) comprises a proteinaceous component comprising free amino acids and (ii) the ratio of the fat component to the proteinaceous component (F:P) is from about 0.45:1.0 to about 1.0:1.0. The F:P ratio of the pet food product is preferably less than about 0.9:1.0, preferably no more than about 0.8:1.0, preferably no more than about 0.75:1.0, preferably at least about 0.5:1.0, preferably at least about 0.6:1.0, preferably at least about 0.65:1.0, and preferably the F:P ratio is about 0.7:1.0.

Substitution of a portion of the protein in a reference or existing pet food product with a proteinaceous additive comprising free amino acids provides a pet food product of the invention which contains a higher proportion of free amino acids in the proteinaceous component compared to the reference/existing pet food product, as described further below, particularly wherein the proteinaceous component comprises free amino acids in an amount of from 3 wt % to 50 wt %, more preferably from 12 wt % to 50 wt % by total weight of the proteinaceous component.

Pet food is commonly categorized on the basis of its moisture content:
  (1) Dry or low moisture content products (defined herein as exhibiting less than 15 wt % moisture content). These products typically combine high nutritional content with convenience.
  (2) Semi-moist or semi-dry or soft dry or intermediate or medium moisture content products (defined herein as exhibiting from 15 to 50 wt % moisture content).
  (3) Wet or high moisture content products (defined herein as exhibiting greater than 50 wt % moisture content). These products are generally most palatable to pets.

The term "pet food" as used herein refers to a food composition designed for ingestion by a pet. The wet pet food described herein is preferably a nutritionally balanced food product to provide a pet with all the essential nutrients it needs in the appropriate quantities.

The pet food may be a pet food providing health and/or nutrition benefits to the pet, e.g. weight management pet foods, satiety pet foods and/or pet foods capable of improving renal function in the pet.

The pet food product and the components used therein are selected for consumption by a pet and are not intended for consumption by humans. The term "pet" as used herein preferably refers to a domestic animal, preferably a companion animal, particularly cats or dogs, and in a preferred embodiment cats.

Typically, wet pet food products contain reconstituted meat material from the reconstitution of animal by-products. The present invention is particularly directed towards wet pet food, of which there are two main types.

The first type of wet pet food product is known as 'paté' or 'loaf' and is typically prepared by processing a mixture of edible components under heat to produce a homogeneous semi-solid mass that is structured by heat-coagulated protein. This homogeneous mass is usually packaged into single serve or multi serve packaging which is then sealed and sterilized. Upon packing, the homogeneous mass assumes the shape of the container.

The second type of wet pet food product is known as 'chunk-in-gravy', 'chunk-in-jelly' or 'chunk-in-mousse', depending on the nature of the sauce component, and these types of products are referred to generically herein as 'chunk-in-sauce' products. The chunks comprise meat pieces or, more typically, aesthetically pleasing restructured or reconstituted meat chunks. Restructured meat chunks are typically prepared by making a meat emulsion containing a heat-settable component, and by applying thermal energy to 'set' the emulsion and allowing it to assume the desired shape, as described in more detail hereinbelow. The product pieces are combined with a sauce (e.g. gravy, jelly or mousse) in single serve or multi serve packaging which is then sealed and sterilized.

The present invention is particularly directed to 'chunk-in-sauce' wet pet food products, and particularly to 'chunk-in-gravy' and 'chunk-in-jelly' wet pet food products.

The reconstituted animal material may contain any of the ingredients conventionally used in the manufacture of reconstituted meat and wet pet food products, such as fat(s), antioxidant(s), carbohydrate source(s), fibre source(s), additional source(s) of protein (including vegetable protein), seasoning, colorant(s), flavouring(s), mineral(s), preservative(s), vitamin(s), emulsifier(s), farinaceous material(s) and combinations thereof.

The reconstituted animal material may also be referred to as a "meat analogue"

The reconstituted animal material may be prepared by an extrusion process at elevated temperature, according to conventional techniques known in the art.

In one preferred embodiment, the reconstituted animal material is prepared by high moisture extrusion techniques or melting techniques such as those described in e.g. WO-00/69276-A and WO-2018/125615. Another suitable process for making the reconstituted animal material is described in U.S. Pat. No. 4,247,562. In general terms, the heated extruder is used to combine ingredients, typically also with water. The mixture is plasticised and heated to form a hot, viscous and at least partly molten mass. The extruder mixes, heats, coagulates, expands and shears the mixture into a meat-like mass which is then extruded and formed into shapes as desired.

In a further preferred embodiment, the reconstituted animal material is prepared by a process comprising the steps of:
(a) providing ground animal material (which is suitably prepared by grinding pieces of animal material to prepare ground animal material, said animal material being selected from meat, animal by-products and combinations thereof);
(b) mixing the ground animal material with a heat-settable binder, and optionally additional ingredients, for instance the ingredients conventionally used in the manufacture of reconstituted meat and wet pet food products described hereinabove, to prepare a slurry;
(c) subjecting the slurry to conditions of shear to produce an emulsion;
(d) forming a layer of emulsion;
(e) heating the layer of emulsion to an internal temperature of at least 70° C. (preferably at least about 80° C.); and
(f) cutting or shredding the layer into discrete pieces of reconstituted animal material.

This is the preferred method of manufacture of the pet food products of the present invention.

The ingredients may be mixed using any suitable equipment conventional in the art, for instance a heated extruder or a jacketed paddle mixer, optionally combining the ingredients with water.

In the process described above, the slurry preferably comprises from about 50 to about 99 wt % (preferably from about 60 to about 99 wt %, preferably from about 65 to about 99 wt %, %, and preferably no more than about 95 wt % or no more than about 90 wt % or no more than about 85 wt %) of the ground animal material.

The emulsification of the slurry may be performed in any conventional equipment, for instance a bowl chopper, or meat grinders, including rotating knives and die-plate combinations comprising holes of a defined diameter (for instance from about 0.5 mm to about 10 mm) through which the material passes.

Optionally, the resulting material may then be transferred to a mixer where water, dry ingredients (e.g., protein powder of vegetable origin) and liquid ingredients may be added.

The layer of emulsion formed in the process may take the form of, for instance, a sheet, a slab, a ribbon or rope.

The layer of emulsion is suitably heated from below by applying steam to the underside of a continuous belt carrying said layer and/or from above by bringing steam into direct contact with the layer of emulsion. Preferably, the emulsion is cooked in a steam tunnel, typically comprising a conveyor system (such as a conveyor belt), which blanches or cooks the emulsion with saturated or super-heated steam injected from above and/or below, thereby exposing the emulsion to a continual and even application of steam to ensure it is cooked thoroughly and set. The emulsion may be in the form of individual chunks during the heating step, but typically cutting into chunks is performed after the heating step.

As used herein, the term "emulsion" refers to a thick mixture of water and other substances derived from raw materials, such as meat or meat by-products. These "emulsions" are dispersions of fat particles and air bubbles in a complex phase composed of water, solubilized meat protein, cellular components and other ingredients. The emulsions may also be referred to as a meat "batter" or a meat "slurry". Such terms are well understood in the art and are used interchangeably.

Typically, the emulsions comprise a continuous phase which is an aqueous medium comprising soluble proteins, soluble muscle constituents, segments of muscle fibres, connective tissue fibres, bones, etc., and optionally materials of plant origin materials such as proteins and/or starches and/or fibres and/or minerals, as well as further additives conventional in the art.

The total protein content of the reconstituted animal material is preferably in an amount in the range of from about 5 to about 40 wt %, preferably at least about 10 wt %, preferably at least about 15 wt %, and typically no more than about 36 wt %, and preferably from about 25 wt % to about 36 wt %. The protein may comprise animal protein(s), vegetable protein(s) or any combination thereof. The protein fraction of the reconstituted animal material preferably contains at least 50 wt % of animal protein, preferably at least about 60 wt %, preferably at least about 70 wt %, preferably at least about 80 wt %, preferably at least about 90% of animal protein, by total weight of the protein fraction of the reconstituted animal material. Animal proteins include any protein of animal origin (including vertebrate and invertebrate proteins), e.g. proteins derived from mammals, fowl, fish and insects. Examples of suitable animal proteins include those derived from chicken, turkey, beef, lamb, pork, venison, buffalo, duck, kangaroo, shell fish, crustaceans, salmon, tuna, whitefish and the like. They may suitably be derived from muscle meat, organs, tendons, bone etc. Further suitable animal proteins include milk or egg derived proteins. Suitable vegetable proteins include proteins derived from wheat, maize, pea, lupine, potato, beans, lentils and the like, for example wheat gluten, and proteins from the press cake of seeds and nuts for oil production, for example sunflower, pumpkin, rape seed, peanut, hazelnuts, walnuts, hemp and the like. The proteins may be in any suitable form, including but not limited to, isolated or partially isolated, concentrated or ground.

An advantage of the present invention is that the enhancement in palatability, by substitution of a portion of the protein with a proteinaceous additive, is observed for a variety of different products containing different sources of protein. Therefore, the invention provides a way to enhance palatability of a product made from more sustainable raw materials (e.g. to reduce the use of meat materials where there is a high demand in the human food chain or for environmental reasons). The invention is also particularly useful for improving the palatability of a product which will benefit from a palatability uplift, such as non-fish containing cat food products.

The fat content of the reconstituted animal material is preferably less than about 15 wt %, preferably no more than about 13 wt %, preferably no more than about 12 wt %, preferably no more than about 10 wt %, preferably no more than about 8 wt %, preferably at least about 2 wt %, preferably at least about 4 wt %. The term "fat" as used herein refers to esters of fatty acids such as triglycerides, diglycerides, monoglycerides and phospholipids. The fat preferably contains at least 50 wt %, more preferably at least 70 wt % of triglycerides. The fat may suitably contain animal fat, vegetable oil, marine oil and combinations thereof. Typically, the fat contains at least 10 wt %, more preferably at least 30 wt % and most preferably at least 50 wt % of an animal fat. The animal fat preferably originates from an animal selected from cattle, pigs, sheep, goat, poultry, fish and combinations thereof.

The water content of the reconstituted animal material is typically up to about 75 wt %, or up to about 65 wt %, and typically at least about 20 wt % or at least about 30 wt % or at least about 40 wt % or at least about 50 wt %, and preferably in the range of from about 50 to about 55 wt %, by total weight of the reconstituted animal material.

The fibre and carbohydrate content of the reconstituted animal material is typically up to about 20 wt %, by total weight of the reconstituted animal material. Preferably, the reconstituted animal material comprises no more than about 10 wt % fibre, preferably no more than about 5 wt %, preferably no more than about 2 wt %, typically no more than about 1 wt %, and preferably at least about 0.5 wt %, by total weight of the reconstituted animal material.

When the pet food product is a wet pet food product, the reconstituted animal material which forms the loaf or the chunk typically exhibits a density of from about 0.8 to about 1.2 g/ml.

The size of the reconstituted animal material will vary and depends on the animal that is to consume the pet food and/or the format of the pet food. The longest dimension of the reconstituted animal material is typically from about 5 mm to about 200 mm, preferably at least about 10 mm, preferably no more than about 150 mm. Where the reconstituted animal material is a chunk suitable for a chunk-in-sauce product, the longest dimension is preferably no more than about 50 mm, more preferably no more than about 40 mm, more preferably no more than about 30 mm, and in a preferred embodiment from about 5 mm to 25 mm, preferably from about 8 to about 16 mm.

The wet pet food of the present invention may be a loaf (or paté) product. As noted above, such products are normally in the form of a single piece of reconstituted animal material packaged in a container, such as a can, a pouch or a tray. Typically, these shaped pieces of reconstituted animal material have a piece volume of from about 20 to about 2,000 cm$^3$, more preferably from about 30 to about 1,500 cm$^3$, for instance from about 500 to about 1200 cm$^3$ when the wet pet food product is intended for a dog, or from about 35 to about 450 cm$^3$ when the wet pet food product is intended for a cat.

After packaging and sealing, the aforementioned product is preferably sterilized within the package, e.g., by retort sterilization.

Preferably, the wet pet food product of the present invention is a chunk-in-sauce product. The term "sauce" as used herein encompasses gravies, jellies and mousses, and preferably refers to a composition in the form of a fluid, a paste, a gel or a mousse. The sauce comprises a liquid carrier, such as water, fats or oils. Preferably the composition is an aqueous composition. A chunk-in-sauce product is prepared by combining the pieces of reconstituted animal material with a sauce, packaging the combination, sealing in the package and sterilizing the package, e.g. by retort sterilization. The pieces of reconstituted animal material may be added to the packaging while the sauce is poured over the pieces, for instance a heated sauce which allows the pieces to warm up and trapped gases to be expelled prior to sealing the packaging. Alternatively, ingredients are added to the reconstituted animal material and packaged, where the ingredients, in the usual sterilisation process, result in the formation in the package of the sauce mixed with the reconstituted animal material.

Sealing of the packaging may be conducted using ultrasonic, thermal or vacuum-sealing, and preferably is conducted using ultrasonic or thermal sealing.

Retort sterilization is preferably conducted at a retorting temperature in the range from about 115° C. to about 130° C., preferably for approximately 20 to 120 minutes, in order to produce a commercially sterile product.

The packaging may be a can (or tin) or jar (e.g. glass) or otherwise a plastic, metal, foil pouch, or flexifoil.

The wet pet food product may comprise up to 100 wt % of the reconstituted animal material, and preferably at least about 5 wt % of the reconstituted animal material, by total weight of the wet pet food product. In other words, the wet pet food product may comprise, consist essentially or consist of the reconstituted animal material. A loaf product suitably consists essentially or consists of the reconstituted animal material. A chunks-in-sauce product preferably comprises a ratio of reconstituted animal material: sauce of from about 20:80 to about 90:10, preferably at least about 30:70, preferably at least about 40:60, preferably at least about 50:50, preferably at least about 60:40.

The sauce component of the wet pet food product may be any suitable sauce conventional in the art of wet pet food, and typically exhibits a water content of at least about 80 wt %, typically at least about 90 wt %, typically no more than about 98 wt %, by total weight of the sauce. The sauce typically comprises a thickening agent which is used to control its consistency. Thickeners or gelling agents that may be used to prepare the sauce include carrageenan, xanthan, guar gum, *Cassia* gum, starch, gelatine, locust bean gum, tara gum, konjac gum, carboxymethyl cellulose, methyl cellulose and combinations thereof. The sauce is typically a coating which surrounds the reconstituted animal material.

The sauce may contain additional ingredients conventionally used in the manufacture of wet pet food products, such as fat, antioxidants, carbohydrates, seasoning, colorants, flavouring, minerals, preservatives, vitamins, emulsifiers, farinaceous materials and combinations thereof.

In the present invention, it is preferred that the proteinaceous additive comprising free amino acids is added to and present in the sauce of a chunk-in-sauce product. Where the pet food product of the present invention is a loaf product, the proteinaceous additive is added to and present in the reconstituted animal material. However, the preferred pet food product of the present invention is a chunk-in-sauce wet pet food product wherein the proteinaceous additive comprising free amino acids is added to and present in the sauce. Thus, the free amino acids of the proteinaceous additive are preferably present in the sauce of the chunk-in-sauce wet pet food product.

The total fat content of the pet food product is preferably in an amount in the range from about 2.0 wt % to about 8.0 wt %, preferably less than about 7.0 wt %, preferably no more than about 6.0 wt %, preferably at least about 3.0 wt %, preferably at least about 4.0 wt %, and preferably from about 4.0 wt % to about 7.0 wt %.

The total proteinaceous content of the pet food product is in the range of from about 6.0 to about 14.0 wt %, preferably at least about 6.5 wt %, preferably greater than 6.5 wt %, preferably at least about 7.0 wt %, and preferably no more than about 12.0 wt %, typically no more than about 11.5 wt %, preferably no more than about 10.0 wt %, and preferably from about 6.0 wt % to about 12.0 wt %, preferably from about 6.5 wt % to about 12.0 wt %, and preferably from greater than 6.5% to about 12.0 wt %, and particularly preferably from about 6.0 wt % to about 10.0 wt %, preferably from about 6.5 wt % to about 10.0 wt %, and preferably from greater than 6.5% to about 10.0 wt %, and particularly wherein the pet food product is manufactured by an SFM process. Advantageously, the proteinaceous content of at least 6.0 wt %, and preferably at least or greater than 6.5 wt %, of the pet food product of the present invention provides a complete nutritional product.

The content of free amino acids in the pet food product is at least 0.5 wt % by total weight of the pet food product. The content of free amino acids in the pet food product is preferably up to about 6.0 wt %, or up to about 4.0 wt %, and preferably greater than about 0.5 wt %, preferably at least 0.6 wt %, preferably at least 0.7 wt %, and preferably in the range of from about 0.7 wt % to about 2.5 wt %, by total weight of the pet food product. When the free amino acids comprise glycine, the content of glycine in the pet food product is typically up to about 3.5 wt %, or up to about 2.5 wt %, or preferably up to about 2.0 wt % and preferably at least about 0.5 wt % or at least about 0.7 wt %, and preferably in the range of from about 1.0 wt % to about 1.5 wt %, by total weight of the pet food product.

The amount of the free amino acids present in the proteinaceous component of the wet pet food product is preferably at least about 4 wt %, preferably at least about 5 wt %, preferably at least about 10 wt %, preferably at least about 12 wt %, preferably at least about 14 wt %, preferably at least about 15 wt %, and preferably no more than about 50 wt %, preferably no more than 45 wt %, preferably no more than about 40 wt %, preferably no more than about 30 wt %, and preferably no more than about 25 wt % by total weight of the proteinaceous component of the pet food product. Preferred ranges are from about 5 wt % to about 50 wt %, from about 5 wt % to about 30 wt %, preferably from about 10 wt % to about 25 wt % by total weight of the proteinaceous component of the wet pet food product. Further preferred ranges are from about 12 wt % to about 50 wt %, preferably from about 14 wt % to about 25 wt % by total weight of the proteinaceous component of the pet food product.

In the case of the preferred chunk-in-sauce wet pet food product, preferably a proteinaceous additive comprising free amino acids is present in the sauce in amounts sufficient to provide the pet food product with free amino acids in an amount of from 0.5 wt % to 6.0 wt %, or in the preferred amounts described immediately hereinabove, by total weight of the pet food product.

Preferably, at least 50 wt %, preferably at least 60 wt %, preferably at least 70 wt %, preferably at least 80 wt %, preferably at least 90 wt %, preferably at least 95 wt %, preferably at least 98 wt %, preferably at least 99 wt % of the free amino acids in the pet food product are provided by the proteinaceous additive. Thus, in the preferred embodiment of a chunk-in-sauce wet pet food product, at least 50 wt %, preferably at least 60 wt %, preferably at least 70 wt %, preferably at least 80 wt %, preferably at least 90 wt %, preferably at least 95 wt %, preferably at least 98 wt %, preferably at least 99 wt % of free amino acids in the pet food product are provided by the proteinaceous additive added to and present in the sauce.

The total fibre content of pet food product is preferably no more than about 5 wt %, preferably no more than about 2 wt %, preferably no more than about 1 wt %, preferably at least about 0.1 wt %, by total weight of the product.

According to a second aspect of the invention, there is provided the use of a proteinaceous additive comprising free amino acids for improving the palatability of a wet pet food product comprising chunks of reconstituted animal material and a sauce, wherein the wet pet food product comprises a fat component in an amount of from 2.0 wt % to 8.0 wt % and a proteinaceous component in an amount of from 6.0 wt % to 14.0 wt %, by total weight of the wet pet food product, wherein said proteinaceous component comprises polypeptides and free amino acids, wherein the ratio of the fat component to the proteinaceous component is from about 0.45:1.0 to about 1.0:1.0, and wherein the content of free amino acids in the pet food product is at least 0.5 wt % by total weight of the pet food product, and wherein said proteinaceous additive comprising free amino acids is present in the sauce.

In the second aspect of the invention, it is preferred that the proteinaceous additive is used to improve the palatability of an existing pet food product by substituting a portion of the proteinaceous component of an existing recipe for a wet pet food product with the proteinaceous additive to provide a wet pet food product according to the invention.

According to a third aspect of the invention, there is provided a method for improving the palatability of a wet pet food product comprising chunks of reconstituted animal material and a sauce, said method comprising the steps of providing chunks of reconstituted animal material and a sauce, and wherein said method further comprises the step of adding a proteinaceous additive to the sauce, such that the wet pet food product comprises a fat component in an amount of from 2.0 wt % to 8.0 wt % and a proteinaceous component in an amount 6.0 wt % to 14.0 wt %, by total weight of the wet pet food product, wherein the ratio of the fat component to the proteinaceous component is from about 0.45:1.0 to about 1.0:1.0, and wherein the content of free amino acids in the pet food product is at least 0.5 wt % by total weight of the pet food product, and wherein said proteinaceous component comprises polypeptides and free amino acids.

In the third aspect of the invention, it is preferred that the step of adding a proteinaceous additive to the sauce to improve the palatability of a wet pet food product is conducted by substituting a portion of the proteinaceous component of an existing recipe for a wet pet food product with the proteinaceous additive to provide a wet pet food product according to the invention.

According to a fourth aspect of the invention, there is provided a process for preparing a wet pet food product according to the first aspect of the invention, wherein the process comprises the step of adding a proteinaceous additive comprising free amino acids to a product comprising a reconstituted animal material. Preferably, the proteinaceous additive is added to the sauce component of a chunk-in-sauce wet pet food product.

The description and preferences for the first aspect of the invention apply equally to the second, third and fourth aspects of the invention.

The invention is illustrated with reference to the following non-limiting examples.

EXAMPLES

Feeding Trial Protocol

The palatability of the test products (Examples 1-6) were evaluated using a ranking test. The intake (g) of each test product was measured and the mean intake (g) of each test product was determined and analysed.

Examples 1-4 (FIG. 1: Trial A)

Wet cat food products (Examples 1 to 4) comprising a reconstituted animal material and a gravy, i.e. a chunk-in-sauce type product, were prepared using a typical recipe and conventional preparation techniques. Example 2 is the example according to the invention. Examples 1, 3 and 4 are reference examples.

Example 1 had a fat to protein (F:P) ratio of 0.7, calculated as the F:P ratio in the whole composition of the pet food product. The F:P ratio in the wet cat food products was varied by increasing the amount of proteinaceous material by addition of protein (Example 3), or by addition of a proteinaceous additive which was glycine (Examples 2 and 4). The proteinaceous additive was added into the sauce.

The palatability of the four wet cat food products (Examples 1 to 4) were compared in a feeding trial by measuring the amount of the product eaten by cats according to the feeding trial protocol mentioned above. The results are shown in FIG. 1 and demonstrate that there was no direct correlation between improved palatability and increasing the amount of proteinaceous material and reducing the F:P ratio. Surprisingly, however, the data show that there was a statistically significant preference for the product of Example 2 over Example 3, indicating that reducing the total protein content in combination with the addition of a proteinaceous additive improves palatability. The statistically significant preference for Example 2 over Example 4 demonstrates that the proteinaceous additive must be added at relatively higher F:P ratios in order to significantly improve palatability.

The properties of the pet food products are given in Table 1 below. All examples had the same visual appearance.

TABLE 1

|  | Example 1 | Example 2 | Example 3 | Example 4 |
|---|---|---|---|---|
| Total Proteinaceous material (wt %) | 8.5 to 9.5 | 9.5 to 10.5 | 12.0 to 13.0 | 13.5 to 14.5 |
| Free amino acid (wt %) | ≤0.2 | 1.0 to 2.0 | ≤0.2 | 1.0 to 2.0 |
| Fat (wt %) | 5.5 to 6.7 | 5.5 to 6.7 | 4.0 to 5.0 | 4.0 to 5.0 |
| F:P ratio | 0.72 | 0.58 | 0.37 | 0.33 |
| Mean intake (g) | 73.47 | 84.83 | 64.82 | 68.72 |

Figure 2:
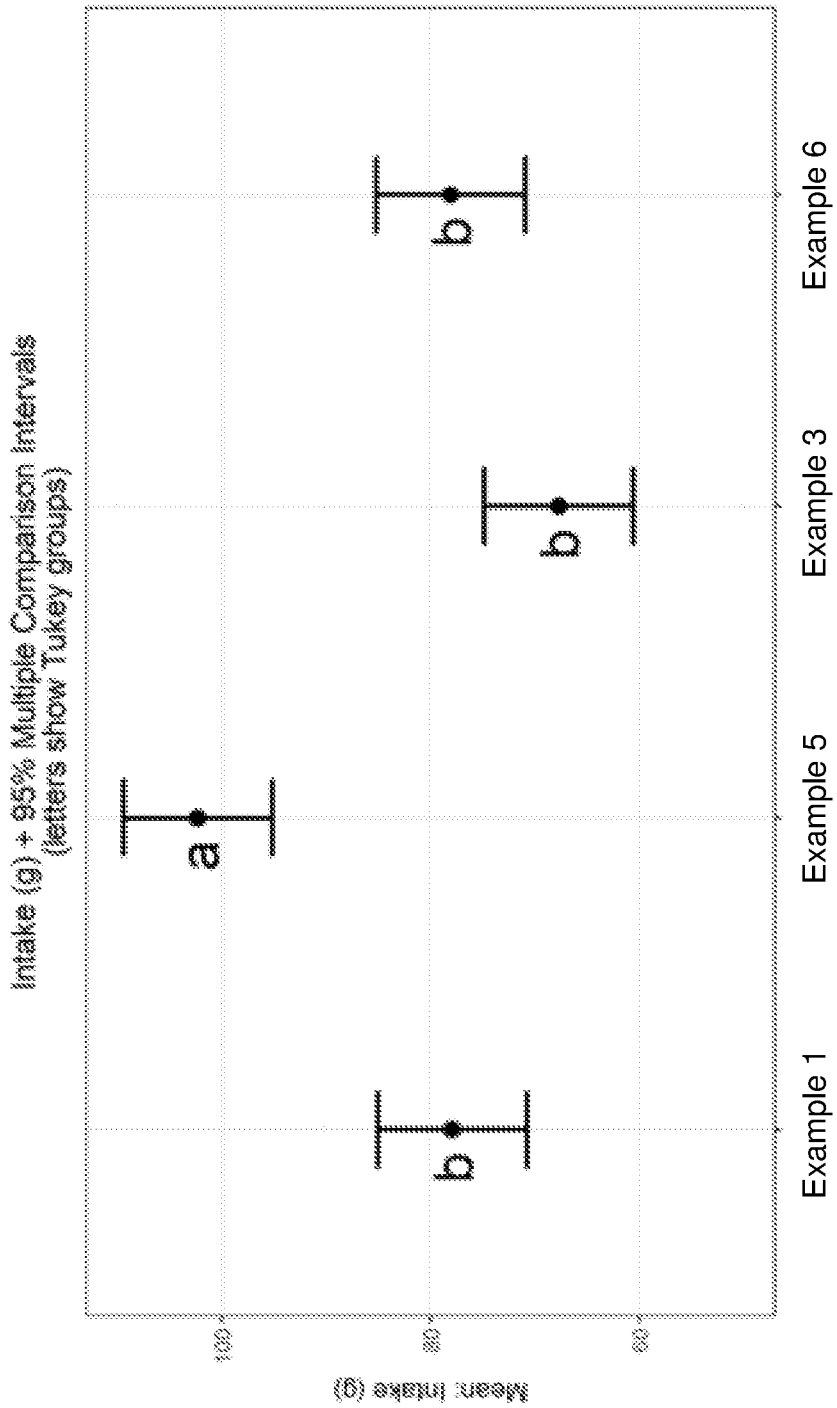
FIG. 2 shows the mean intake (g) across Examples, 1, 5, 3, and 6.

Examples 5-6 (FIG. 2: Trial B)

Chunk-in-sauce wet cat food products (Examples 5 and 6) were prepared in the same manner as described above. Example 5 is the example according to the invention. Example 6 is a reference example.

The product of Example 5 corresponded to Example 1 except that a portion of the proteinaceous material of Example 1 was substituted with glycine. The total amount of the proteinaceous component was the same as in Example 1 so that the F:P ratio in Example 1 and 5 was the same. Similarly, the product of Example 6 corresponded to Example 3 except that a portion of the proteinaceous material of Example 3 was substituted with glycine. The total amount of the proteinaceous component was the same as in Example 3 so that the F:P ratio in Example 3 and 6 was the same.

In this trial, Examples 1, 3, 5 and 6 were evaluated and the palatability of the four wet cat food products were compared in a feeding trial as described above. The results are shown in FIG. 2 and show that substituting a portion of the protein with free amino acids improves the palatability of the product. However, unexpectedly the effect of improved palatability by substitution of a portion of the protein with free amino acids was only statistically significant when the F:P ratio was 0.7 (Example 5) compared to 0.35 (Example 6) which indicates that cats can distinguish between products of differing F:P ratio and that the F:P ratio is important. The data also show that the product of Example 5 was significantly preferred over Example 3, indicating that reducing the total protein content in combination with the addition of the proteinaceous additive improves palatability. Notably, the improvement in palatability from Example 3 to Example 5 is enhanced compared to the improvement in palatability observed in Trial A between Example 3 and Example 2 indicating that an increased F:P ratio contributes to the improvement in palatability.

The properties of the products are given in Table 2 below. All examples had the same visual appearance.

TABLE 2

|  | Example 1 | Example 5 | Example 3 | Example 6 |
|---|---|---|---|---|
| Total Proteinaceous material (wt %) | 8.0 to 9.5 | 8.0 to 9.5 | 12.0 to 13.0 | 12.0 to 13.0 |
| Free amino acid (wt %) | ≤0.2 | 1.0 to 2.0 | ≤0.2 | 1.0 to 2.0 |
| Fat (wt %) | 5.5 to 6.7 | 5.5 to 6.7 | 4.0 to 5.0 | 4.0 to 5.0 |
| F:P ratio | 0.72 | 0.68 | 0.37 | 0.33 |
| Mean intake (g) | 77.92 | 102.28 | 67.72 | 78.07 |

The invention claimed is:

1. A pet food product comprising a fat component in an amount of from about 5.5 wt % to about 6.7 wt % by total weight of the pet food product, and a proteinaceous component in an amount of from about 8.0 wt. % to about 9.5 wt % by total weight of the pet food product, wherein the ratio of the fat component to the proteinaceous component in the pet food product is about 0.68:1, wherein the proteinaceous component comprises the free amino acid glycine in an amount of from about 12 wt % to about 30 wt %, by total weight of the proteinaceous component, wherein the amount of the free amino acid glycine in the pet food product is about 1 wt. % to about 2 wt. %, by total weight of the pet food product, wherein the total fiber content of the pet food product is from at least about 0.1 wt % to about 5 wt % by total weight of the pet food product, wherein the pet food product comprises reconstituted animal material, and wherein the pet food product is a chunk-in-sauce wet pet food product comprising chunks of reconstituted animal material and sauce.

2. The pet food product according to claim 1, wherein the pet food product comprises a chunk-in-gravy or a chunk-in-jelly wet pet food product.

3. The pet food product according to claim 1, wherein the reconstituted animal material further comprises at least one of fat(s), antioxidant(s), carbohydrate source(s), fiber source(s), additional source(s) of protein, seasoning, colorant(s), flavoring(s), mineral(s), preservative(s), vitamin(s), emulsifier(s), farinaceous material(s), and combinations thereof.

4. The pet food product according to claim 1, wherein the chunks comprise meat pieces or reconstituted meat chunks.

5. The pet food product according to claim 1, wherein the reconstituted animal material exhibits a density of from about 0.8 g/mL to about 1.2 g/mL.

6. The pet food product according to claim 1, wherein the dimension of the reconstituted animal material is from about 5 mm to about 25 mm.

7. The pet food product according to claim 1, wherein the sauce comprises a liquid carrier.

8. The pet food product according to claim 1, wherein the sauce exhibits a water content of at least about 80 wt %.

9. The pet food product according to claim 1, wherein the chunk-in-sauce product comprises a ratio of reconstituted animal material to sauce of from about 20:80 to about 90:10.

\* \* \* \* \*